3,239,510
6-DIALKYLAMINO-4-PREGNENE-3,20-DIONES
Kanzo Sasaki, Osaka, Japan, assignor to Shionogi & Co.,
Ltd., Osaka, Japan
No Drawing. Filed Mar. 2, 1964, Ser. No. 348,863
Claims priority, application Japan, Mar. 30, 1963,
38/16,611
The portion of the term of the patent subsequent to
Mar. 3, 1981, has been disclaimed
9 Claims. (Cl. 260—239.55)

The present invention relates to 6-dialkylamino-4-pregnene-3,20-diones. More particularly, it relates to 6α- and 6β-dialkylamino-4-pregnene-3,20-diones and intermediates thereof.

The objective 6-dialkylamino-4-pregnene-3,20-diones are represented by the following formula:

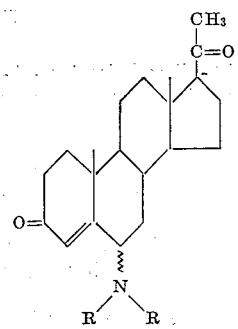

wherein R is a lower alkyl group (e.g. methyl, ethyl, propyl) and the ripple mark ($\xi$) represents a generic indication of α- and β-configurations.

The said 6-dialkylamino-4-pregnene-3,20-diones possess an antagonistic action against hormonic substances. For instance, they exhibit anti-progestational activity.

Accordingly, it is a main object of the present invention to embody 6-dialkylamino-4-pregene-3,20-diones. Another object of this invention is to embody a process for production of 6-dialkylamino-4-pregnene-3,20-diones. A further object of the invention is to embody 6-dialkylamino-4-pregnene-3,20-diones which are pharmacologically active. These and other objects will be apparent to those conversant with the art to which the present invention pertains from the subsequent description.

The objective 6-dialkylamino-4-pregnene-3,20-diones may be prepared from 5α,6α-epoxypregnane-3,20-dione 3,20-bisethyleneketal according to the following scheme:

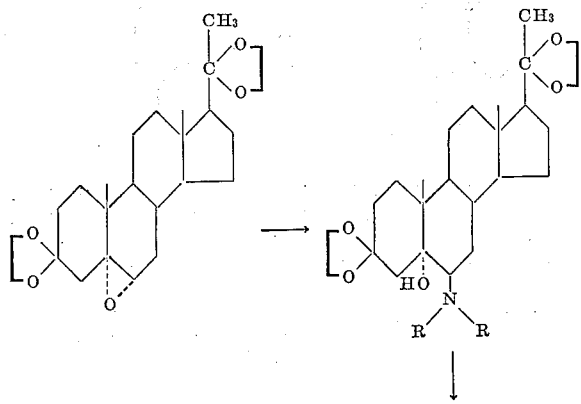

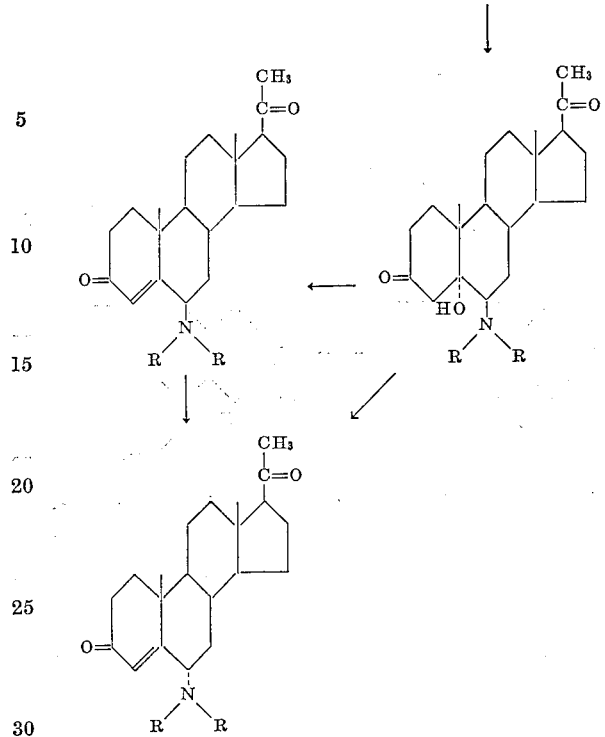

wherein R has the same significance as designated above.

The starting material of the present invention, 5α,6α-epoxypregnane-3,20-dione 3,20-bisethyleneketal, is a known steroid [Bowers et al.: Tetrahedron, vol. 7, p. 138 (1959)].

The starting 5α,6α-epoxypregnane-3,20-dione 3,20-bisethyleneketal is first subjected to addition of dialkylamine. The reaction may be effected by treating the said starting steroid with dialkylamine, if necessary in a suitable inert solvent, at a relatively high temperature usually from 100 to 200° C. The resultant 5α-hydroxy-6β-dialkylaminopregnane-3,20-dione 3,20-bisethyleneketal is then subjected to elimination of the protecting ethyleneketal group. The reaction may be executed by a per se conventional manner, e.g. treatment with p-toluenesulfonic acid while refluxing. Then, the resulting 5α-hydroxy-6β-dialkylaminopregnane-3,20-dione is subjected to dehydration. The reaction may be carried out by treatment with a dehydrating agent usually at a relatively low temperature from 0 to 30° C. As the dehydrating agent, there can be employed various substances such as an acid (e.g. hydrochloric acid, sulfuric acid, acetic acid, p-toluenesulfonic acid), a halogenating agent (e.g. phosphorus oxychloride, phosphorus oxybromide, phosphorus trichloride), a sulfonylating agent (e.g. thionyl chloride, thionyl bromide) and a base (e.g. alumina). The configuration of the dialkylamino group at the 6-position of the objective 6-dialkylamino-4-pregnene-3,20-dione is associated with the kind of the dehydrating agent, and a suitable selection of the dehydrating agent in accordance with the object is required. For instance, the use of an acid gives 6α-dialkylamino-4-pregnene-3,20-dione, while the use of a halogenating agent or a base affords 6β-dialkylamino-4-pregnene-3,20-dione. When treated with an acid, 6β-dialkylamino-4-pregnene-3,20-dione can be readily converted into the corresponding 6α-isomer, i.e. 6α-dialkylamino-4-pregnene-3,20-dione.

The thus produced 6-dialkylamino-4-pregnene-3,20-dione is useful as an anti-progestational agent. For instance, 6α - dimethylamino-4-pregnene - 3,20 - dione produced block of progestational response induced by 4 milligrams of progesterone in the Clauberg rabbits (the estrogen-primed immature rabbits), when administered at a dose of 2.5 milligrams by intrauterine injection.

Presently preferred embodiments of the present invention are shown in the following examples. In these examples, abbreviations have conventional meanings: e.g. mg., milligram(s); g., gram(s); ml., millilitre(s); ° C., degrees centigrade.

*Example 1*

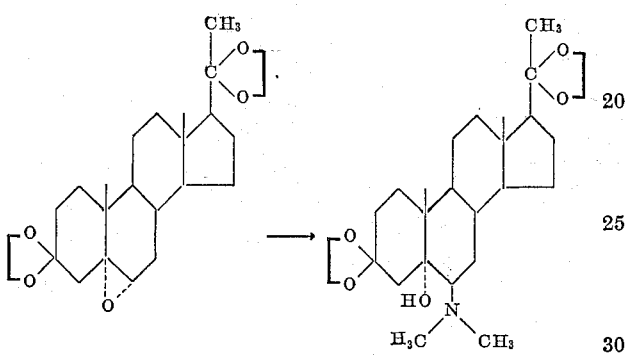

Preparation of 5α-hydroxy-6β-dialkylaminopregnane-3,20-dione 3,20-bisethyleneketal.—To a suspension of 5α,6α-epoxypregnane-3,20-dione 3,20-bisethyleneketal (1.00 g.) in ethyleneglycol (30 ml.), there is added dropwise dimethylamine (1.5 ml.), and the resultant mixture is heated at 153° C. in an autoclave. The yellowish orange reaction mixture is cooled whereby fine crystals are separated. The crude crystals are collected by filtration, washed with ethyleneglycol and water in order and dissolved in chloroform. The chloroform solution is washed with saturated sodium chloride solution, dried over anhydrous sodium sulfate and concentrated under reduced pressure. The residue (1.03 g.) is crystallized from a mixture of dichloromethane and methanol to give 5α-hydroxy-6β-dimethylaminopregnane - 3,20 - dione 3,20-bisethyleneketal (893 mg.) as crystals melting at 172° C. $[\alpha]_D^{26} -65.1 \pm 2°$ (c.=1.000, chloroform).

IR: $\nu_{max.}^{Nujol}$ 3517 cm.$^{-1}$

Analysis.—Calcd. for $C_{27}H_{45}O_5N$: C, 69.94; H, 9.78; N, 3.02. Found: C, 69.92; H, 9.85; N, 3.09.

*Example 2*

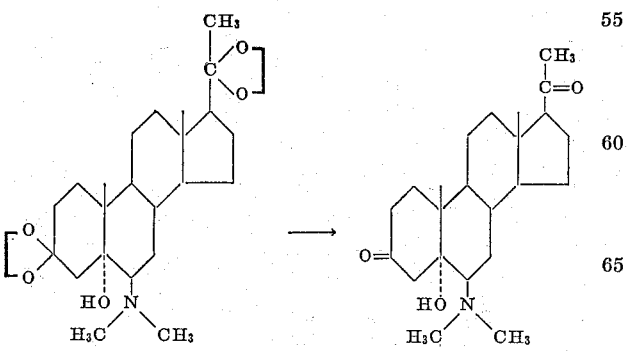

Preparation of 5α-hydroxy-6β-dialkylaminopregnane-3,20-dione.—To a solution of 5α-hydroxy-6β-dimethylaminopregnane-3,20 - dione 3,20 - bisethyleneketal (417 mg.) in acetone (35 ml.), there are added p-toluenesulfonic acid (300 mg.) and water (1.5 ml.), and the resultant mixture is refluxed for 45 minutes on a water bath. The reaction mixture is made alkaline with 10% sodium hydroxide solution and concentrated under reduced pressure. The residue (435 mg.) is crystallized from a mixture of dichloromethane and methanol to give 5α-hydroxy-6β-dimethylaminopregnane-3,20 - dione (289 mg.) as crystals melting at 244 to 246° C.

$[\alpha]_D^{25} +24.0 \pm 2°$ (c.=1.067, chloroform).

IR: $\nu_{max.}^{Nujol}$ 3374, 2790, 1703, 1681 cm.$^{-1}$

Analysis.—Calcd. for $C_{23}H_{37}O_3N$: C, 73.56; H, 9.93; N, 3.73. Found: C, 73.68; H, 9.75; N, 3.85.

*Example 3*

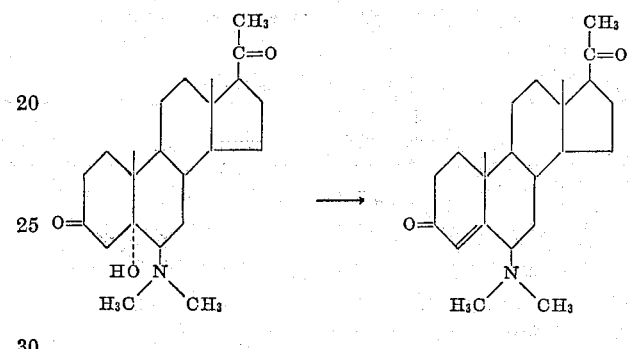

Preparation of 6β - dimethylamino - 4 - pregnene - 3,20-dione.—To a suspension of 5α - hydroxy - 6β - dimethylaminopregnane-3,20-dione (250 mg.) in anhydrous methanol (100 ml.), there is added anhydrous sodium acetate (165 mg.), and the resultant mixture is refluxed for 10 hours in nitrogen stream while stirring. The reaction mixture is concentrated under reduced pressure, combined with a mixture of ice and water and shaken with a mixture of dichloromethane and ether. The organic solvent layer is washed with water, dried and concentrated under reduced pressure to give crude crystals (240 mg.). The crude crystals are dissolved into a mixture of dichloromethane and ether and concentrated under reduced pressure whereby pure crystals are separated. The separated crystals are collected by filtration and dried to give 6β-dimethylamino-4-pregnene-3,20-dione (155 mg.) melting at 176 to 178° C.

IR: $\nu_{max.}^{Nujol}$ 2772, 1697, 1667, 1612 cm.$^{-1}$

Analysis.—Calcd. for $C_{23}H_{35}O_2N$: C, 77.26; H, 9.87; N, 3.92. Found: C, 76.96; H, 9.82; N, 3.97.

*Example 4*

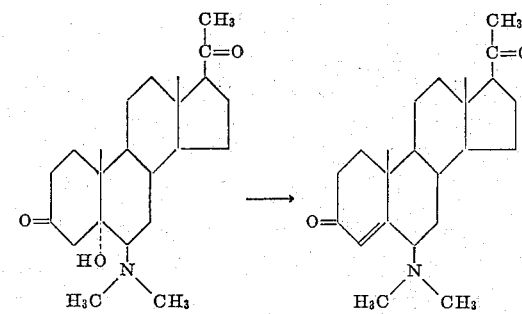

Preparation of 6β - dimethylamino - 4 - pregnene - 3,20-dione.—5α - hydroxy - 6β - dimethylaminopregnane - 3,20-dione (100 mg.) is dissolved in petroleum ether and poured onto a column of alumina. The column is allowed to stand overnight and eluted with a mixture of petroleum ether and benzene. The eluate is concentrated and crystallized from a mixture of dichloromethane and methanol to give 6β-dimethylamino-4-pregnene-3,20-dione (68 mg.).

Example 5

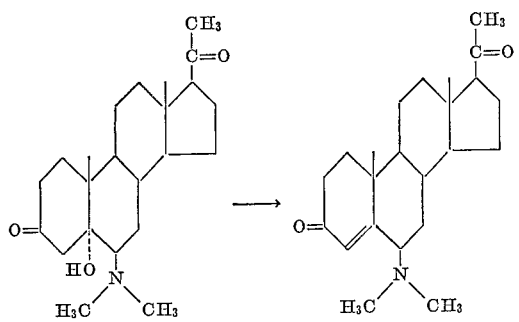

*Preparation of 6β-dimethylamino-4-pregnene-3,20-dione.*—To a solution of 5α-hydroxy-6β-dimethylaminopregnane-3,20-dione (100 mg.) in pyridine (2 ml.), there is added dropwise thionyl chloride (100 ml.) with stirring while ice-cooling. The resultant mixture is stirred for 10 minutes and poured onto a mixture of ice and water. The resulting mixture is made alkaline with 10% sodium hydroxide solution. The separated crystals are collected by filtration, washed with water and dissolved in dichloromethane. The solution is washed with water, dried and concentrated under reduced pressure. The residue is crystallized from a mixture of dichloromethane and methanol to give 6β-dimethylamino-4-pregnene-3,20-dione (57 mg.).

Example 6

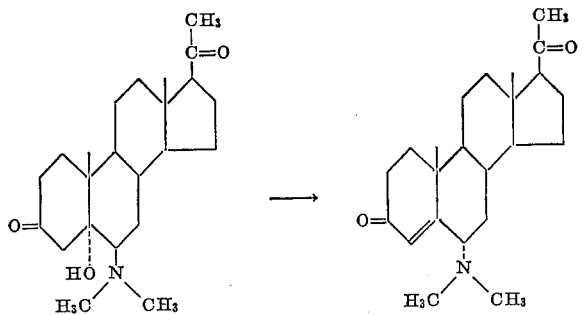

*Preparation of 6α-dimethylamino-4-pregnene-3,20-dione.*—Into a solution of 5α-hydroxy-6β-dimethylaminopregnane-3,20-dione (255 mg.) in glacial acetic acid (3 ml.), there is bubbled dried hydrogen chloride for 1 hour while cooling with ice. The reaction mixture is poured into a mixture of ice and water, adjusted to pH 4 with sodium carbonate and shaken with chloroform. The chloroform layer is shaken with 5% hydrochloric acid. The separated hydrochloric acid layer is adjusted to pH 9 to 10 with sodium carbonate and shaken with chloroform. The chloroform layer is washed with water, dried and concentrated under reduced pressure. The residue (188 mg.) is crystallized from ether to give 6α-dimethylamino-4-pregnene-3,20-dione (132 mg.) as crystals melting at 168 to 170° C.

IR: $\nu_{max}^{Nujol}$ 2779, 1695, 1665, 1608 cm.$^{-1}$

*Analysis.*—Calcd. for $C_{23}H_{35}O_2N$: C, 77.26; H, 9.87; N, 3.92. Found: C, 77.50; H, 9.90; N, 4.04.

Example 7

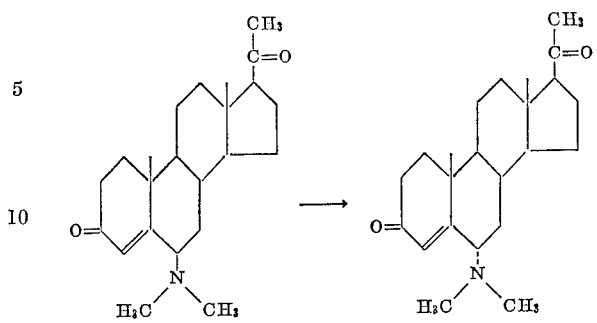

*Preparation of 6α-dimethylamino-4-pregnene-3,20-dione.*—Into a solution of 6β-dimethylamino-4-pregnene-3,20-dione (100 mg.) in glacial acetic acid (1 ml.), there is bubbled dried hydrogen chloride for 1 hour while cooling with ice. The reaction mixture is treated as in Example 6 to give 6α-dimethylamino-4-pregnene-3,20-dione (64 mg.).

What is claimed is:
1. A compound of the formula:

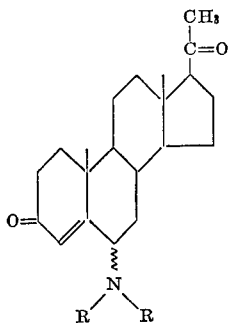

wherein R is lower alkyl and the ripple mark ($\sim$) represents a generic indication of α- and β-configurations.
2. 6α-di(lower)alkylamino-4-pregnene-3,20-dione.
3. 6α-dimethylamino-4-pregnene-3,20-dione.
4. 6β-di(lower)alkylamino-4-pregnene-3,20-dione.
5. 6β-dimethylamino-4-pregnene-3,20-dione.
6. 5α-hydroxy-6β-di(lower)alkylaminopregnane-3,20-dione.
7. 5α-hydroxy-6β-dimethylaminopregnane-3,20-dione.
8. 5α-hydroxy-6β-di(lower)alkylaminopregnane-3,20-dione 3,20-bisethyleneketal.
9. 5α-hydroxy-6β-dimethylaminopregnane-3,20-dione 3,20-bisethyleneketal.

References Cited by the Examiner

UNITED STATES PATENTS 3,123,623   3/1964   Sasaki _____ 260—397.3

OTHER REFERENCES

Tori et al.: "Chemistry and Industry," No. 37, Sept. 14, 1963, pp. 1525–1528.

LEWIS GOTTS, *Primary Examiner.*